United States Patent [19]

Laussermair

[11] 4,018,052
[45] Apr. 19, 1977

[54] ACCUMULATOR TO STORE AND RELEASE BRAKING ENERGY

[76] Inventor: Friedrich Laussermair, Fafnerstrasse 2, 8000 Munich 19, Germany

[22] Filed: Oct. 28, 1975

[21] Appl. No.: 626,203

[30] Foreign Application Priority Data

Oct. 26, 1974 Germany .......................... 2451021

[52] U.S. Cl. .................................. 60/414; 60/721; 74/751
[51] Int. Cl.² ......................................... F16D 61/00
[58] Field of Search ............ 60/721, 413, 414, 709, 60/718; 74/572, 751; 180/54 R, 54 C

[56] References Cited

UNITED STATES PATENTS 3,672,244 6/1972 Nasvytis ........................ 60/721 UX Primary Examiner—Allen M. Ostrager

[57] ABSTRACT

An accumulator arrangement for the storage and release of braking energy, and for the braking and driving of a rotating shaft by means of a flywheel. The rotating shaft which is to be braked or driven, is connected to a drive or gear unit having 2° of freedom; one output of which is coupled to the flywheel via an installation operable either as a generator or a motor, and whose other output is connected with a second installation operable as a generator or a motor, and the two installations are connected with each other for energy transmission, preferably through a buffer or shock absorbing device.

9 Claims, 1 Drawing Figure

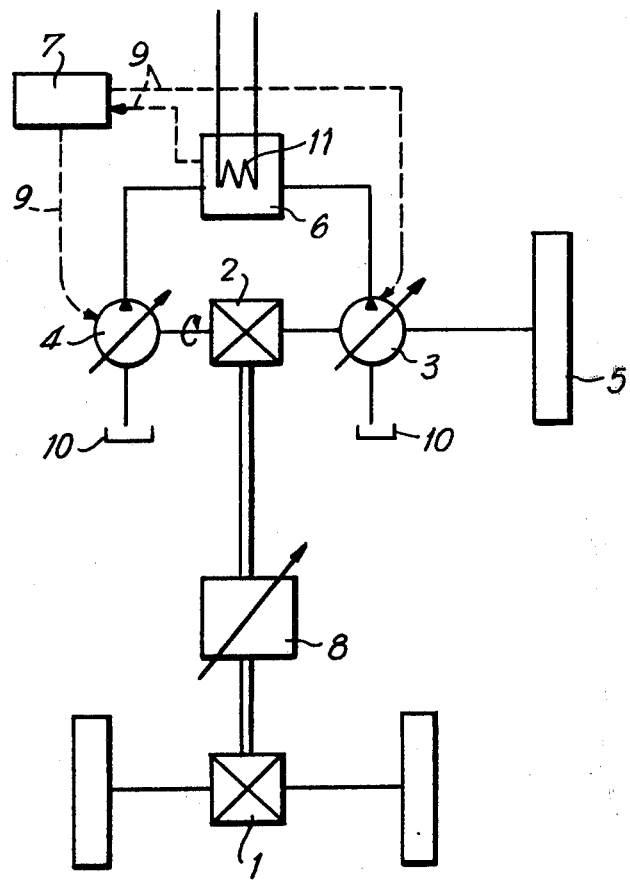

ACCUMULATOR TO STORE AND RELEASE BRAKING ENERGY

FIELD OF THE INVENTION

The present invention relates to an accumulator arrangement for the storage and release of braking energy, and for the braking and driving of a rotating shaft by means of a flywheel.

DISCUSSION OF THE PRIOR ART

In vehicles in which a flywheel energy accumulator is to be used in order to store the braking energy, the problem particularly arises in that a shaft which is connected with the wheels is to be slowed down due to the braking effect, whereas a flywheel is to be accelerated in response to the withdrawn braking energy. At a release of the stored braking energy, for instance, for accelerating the vehicle, the relationships are reversed: while the flywheel is to be braked or decelerated, the vehicle must accelerate. In view of the opposite speed relationships of the vehicle and the flywheel, heretofore the braking energy had to be converted, for example by means of an electric generator, into electrical energy and thus transmitted to the flywheel.

The foregoing has the disadvantage that the total braking power must be transmitted to the flywheel by means of a correspondingly dimensioned generator and electrical drive unit, through which there can be maintained only a comparatively low degree of efficiency. Upon the release of the energy from the flywheel to the wheels of the vehicle, the same degree of efficiency reoccurs, so that the already unsatisfactory degree of efficiency is further quadrupled, and hence leads to a still poorer overall degree of efficiency.

The earlier flywheel-weight energy accumulator thus had to supply two devices, respectively applicable as a generator and as a motor, through which the entire braking energy had to be transmitted. Since devices of this type are comparatively complex, it has heretofore been necessary to limit these devices and thereby also the capacity of the flywheel-weight accumulator, such that in a braking which took place under the release of a comparatively high braking power, only a relatively small portion of this braking power could actually be supplied to the flywheel-weight accumulator. Predicated on the comparatively poor overall efficiency of an installation of that type, the utilization of this kind of a flywheel-weight accumulator has been found to be essentially uneconomical.

SUMMARY OF THE INVENTION

Accordingly, it is an object of the invention to provide an accumulator having the above-mentioned construction in which the storage or accumulation of braking energy can be effectuated with lesser requirements and at an improved degree of efficiency.

The foregoing object is attained in that the rotating shaft which is to be braked or driven, is connected to a drive or gear unit having two degrees of freedom; one output of which is connected to the flywheel via an installation operable either as a generator or a motor, and whose other output is connected with a second installation operable as a generator or a motor, and the two installations are connected with each other for energy transmission preferably through a buffer or shock absorbing device.

For instance, a differential or planetary gear drive can be used as the drive or transmission having 2° of freedom. The braking power released by the shaft is hereby distributed by the differential gear drive. A portion thereof flows directly to the flywheel at a good mechanical degree of efficiency. The remainder flows to the other output and here drives the device which is switched as a generator. The energy produced by the generator is transmitted to the drive switched as a motor on the shaft of the flywheel. The flywheel is thus additionally accelerated by this motor power output. The drive, which has been switched or connected as a generator, determines the total braking power released by the shaft by means of its braking torque. In the differential gear drive there exist at both outputs thereof a momentary state of equilibrium. Except for losses, the two outputs have a part power transmitted thereto which is proportional to the respective output shaft rotational speeds. In the event that both output shafts run at the same speed at the beginning of the braking sequence, at first each shaft assumes half of the braking power. The speed of the output shaft at the generator end decreases, whereas the speed of the flywheel increases. The direct, mechanically-transmitted portion increases, while the portion indirectly conveyed by means of both drives decreases. In particular, with the aid of a change-over gear in the shaft which is to be braked, it can be attained that, during the entire braking sequence, by far the larger portion of the braking energy is mechanically transmitted to the flywheel, whereas the remainder is transmitted in the usual manner to the flywheel at a lower degree of efficiency caused by the two drives. As a result thereof, there can be reached extraordinarily good degrees of efficiency. Of further important advantage is the fact that both drives transmit only a portion of the braking power and may therefore be smaller dimensioned than in the usual or previous instance.

Basically, for this type of purpose any conventional device can be employed as generator or motor. Pursuant to a feature of the invention, it is of particular advantage that each of the devices is a fluid-driven motor or a pump. Here, there is suitably utilized a buffer reservoir or accumulator in which there is stored fluid at a high energy level, which, upon need, is then released through the appropriate device, and with the fluid being maintained in readiness in a relaxed or unpressurized state in a collector receptacle. These types of motors, which can be reversed from generator to pump operation are widely used, thereby a particular advantage of the invention lies in that for these portions of the inventive accumulator installation it is not necessary to employ new designs which, in turn, would have to be tested, but use can be made of proven equipment.

It is possible to choose an incompressible medium as the flow medium, which has the advantage that, in this instance, there consists a direct interdependence between the motor and pump rotational speeds and the transmitted quantity of flow medium or fluid. Insofar as the inventive device is used in conjunction with hydraulic systems, in this instance it can be ascertained as an advantage that the buffer reservoir or accumulator is the pressure supply receptacle for the entire installation, respectively, in lieu of the collector receptacle, there serves one of the collector conduits of the entire system.

Within the framework of another construction of the invention further it is, however, of particular advantage that each of the devices is a pneumatic motor or, respectively, generator. Through the use of a compressible fluid or flow medium, the design of the buffer reservoir or accumulator is considerably simplified; moveover, by using air the collector receptacle can be eliminated since—as required, through an appropriate cleaning device—external air can be presently conveyed into the buffer reservoir during generator operation, or uncompressed air can be vented into the atmosphere during motor operation. The buffer reservoir, if necessary, can be replaced by an appropriate control device.

Basically, the device according to the invention can generally be employed wherever braking energy occurs in close sequence and drive energy must be generated, such a case of application, for example, lies in crane or hoist operation. As long as the inventive arrangement is connected with a drive installation which consists of a thermal power engine, in a further embodiment of this invention it is, however, of particular advantage that the heat output end of a thermal power engine is in a heat exchange relationship with the buffer reservoir or accumulator. Hereby, the exhaust heat which, for example is uselessly expelled from a driving thermal power engine, such as a motor, into the surroundings, is used to give up its heat within the buffer reservoir to the stored compressible flow medium, respectively, to the stored air, by means of which there increases the pressure level and thereby the energy content within the buffer reservoir. It is thus possible, by using the device according to the invention, to further utilize the unusable portion of the residual energy in a combustion engine, or in a motor.

A particularly suitable area of application for the accumulator according to the invention lies in its use in a municipal bus. A municipal bus, which brakes at a comparatively fixed sequence at its stops to a standstill and again accelerates to full speed, each braking power recovery results in a saving of the oil used in the drive thereof, as well as a reduction in the emission of the conventional drive system which is particularly damaging in close areas. Beyond the foregoing, the flywheel-weight accumulator for a municipal bus provides for an additional power reserve so that for example, the full occupied bus can accelerate almost as quickly as can an empty bus. In this instance, the flywheel-weight accumulator can be designed relatively small, meaning it essentially encompasses no more than the energy released upon braking once, or occurring a few times; so as to be therefore useful to provide a capacity which comprises a two-fold, kinetic energy of a vehicle moving at 60 km/h in a loaded state.

BRIEF DESCRIPTION OF THE DRAWING

Reference may now be had to the following detailed description of an exemplary embodiment of the invention, taken in conjunction with the single FIGURE of the drawing showing a schematic representation of an accumulator arrangement for a vehicle drive.

DETAILED DESCRIPTION

The planetary gear drive 2 is a transmission having two degrees of freedom, for example, a mechanical differential gear. Hydraulic motors, which are operable in four-quadrant operation, in effect, operating at positive and negative speeds as either pumps or motors, may be provided as drives 3 and 4. Hereinbelow, the invention is described in more detail on the basis of different driving conditions of the vehicle which is provided with the inventive device.

Initially described in a stable driving condition:

Hereby, no energy is either supplied and stored in the flywheel nor released therefrom. Both drives 3 and 4 act in such a manner whereby the shaft, which interconnects the two differential gears 1 and 2 with each other, can rotate freely and unhindered; drive 3 rotates at the same speed as flywheel 5. While the speed of the shaft between the two differential gears 1 and 2 is predetermined, drive 4 rotates at idle load with complimentary speed. With the exception of mechanical losses, no energy is withdrawn from the vehicle by the inventive unit.

When braking takes place, then the drive 4 is braked—it functions as a pump—and hereby converts mechanical energy into hydraulic or, respectively, pneumatic energy. While drive 4 is being braked, the speed of drive 3 increases analogously to the geometry of the differential gear 2, and thereby also the rotational speed of the flywheel 5. Hereby, the energy produced in drive 4 is supplied to flywheel 5 through the gear 2 and drive 3, concurrently with the mechanical energy. Thereby a portion of the used braking energy is directly mechanically transmitted to the flywheel, while the other portion is transmitted to flywheel 5 through drives 3 and 4.

Thereafter hydraulic drive 4 charges a buffer reservoir or accumulator 6 in the transmission conduit to a pressure which is preset by the control system 7. As soon as this pressure is reached, the control system 7 actuates drive 3 which has been switched as a motor. The pressure is so controlled whereby the desired pressure, or a predetermined tolerance range of the pressure, constantly prevails in the accumulator 6.

With a decreasing vehicle speed, the rotational speed of drive 4 drops to zero. The control system regulates by means of the pressure in the buffer system also the drive 3 down to zero power output. The passage of the drive 4 through zero must initiate a signal in the control system 7 for switching over the drive unit 3 from motor-to-generator (pump operation). The pump power output of drive 3 is again regulated by means of the buffer pressure. In the negative rotational speed range, the drive 4 operates now as a motor.

Alternatively to this control or regulating operation, it is also possible to regulate solely by means of the buffer pressure. Thereby, during braking the drive 4 operating at a positive rotational speed is connected as a pump. At a negative rotational speed, this drive operates automatically as a motor. The maximum pressure permissible in the buffer is determined by the regulation. At extensive delays there is predetermined a high buffer pressure and for short delays, a low buffer pressure. Drive 3 operates only at a positive rotational speed. The drive is switched by the control system to a motor as soon as the maximum permissible pressure in the buffer is exceeded. It is reversely switched as a generator or pump as long as a minimum pressure in the buffer drops below a predetermined minimum pressure. Intermediate these minimum and maximum pressures, drive 3 is switched to idling load.

When the vehicle requires energy for acceleration, then the flywheel 5 transmits mechanical power to the planetary gear drive 2. At the same time, the mechanical power of the flywheel 5 in drive 4 is converted into hydraulic/pneumatic energy, which is transmitted to the buffer reservoir. Drive 4, which up to now (with the vehicle being stationary) operates at a negative speed, in spite of its negative speed, transmits a positive torque to the planetary gear drive 2 so that the planetary gear drive of the vehicle transmits direct mechanical energy from the flywheel as well as hydraulically transmissive energy emanating from the flywheel 5 by means of the shaft to the differential gear drive of the vehicle.

As soon as drive unit 4 passes zero rotational speed during acceleration, the control system 7 changes drive 4 to pump operation with a power output which is controlled by the buffer pressure. At a positive rotational speed the drive 4 operates as motor.

At a decreasing speed of the shaft connecting gearboxes 1 and 2 with each other, effected by the braking of the vehicle, the speed of drive 4 is concurrently reduced while the speed of drive 3 increases, and upon acceleration of the vehicle, on the other hand, the rotational speed of drive 4 increases from negative to positive value and concurrently the rotation speed of the flywheel-weight accumulator 5 and drive 3 decreases. Hereby, drive 1 and 2 can be connected by means of a transmission 8.

The drawing does not show the drive motor for the vehicle. It can be provided that the possibly idle flywheel-weight accumulator 5 may again be charged by the vehicle motor, for example, during inoperative periods.

The connection between the two drive units 3 and 4 and the control unit 7 is undertaken by means of signal conduits 9, which may be either hydraulic or pneumatic conduits, as required. In addition, the buffer reservoir 6 is connected with the control unit 7 through a further signal conduit 9, which indicates to the control unit 7 the pressure present in the buffer reservoir 6.

When hydraulic motors or pumps 3 and 4, are respectively used, a collector receptacle 10 is associated with respectively each motor or pump; these two collectors may be connected with one another.

When a pneumatic system is used, the buffer reservoir 6 can be equipped with a heat exchanger device 11, which is connected with the drive motor of the vehicle. A pipe conduit through which the exhaust gases are conducted may serve, for example, as a heat exchanger. If necessary, a control device can also be provided, which bypasses or cuts off the heat exchanger in order to prevent the further supply of heat to the buffer reservoir 6 when, for instance, the pressure reservoir and the buffer reservoir 6 are full, the flywheel 5 rotates at nominal speed, and when the vehicle is stationary. Furthermore, the buffer reservoir 6 can be equipped with a safety valve (not shown in the drawing) which is controlled by the internal pressure of the buffer reservoir 6, and/or through the control unit 7. Moreover, this valve can be arbitrarily actuated, e.g. in order to bleed the still filled buffer reservoir 6 when repairs of the system must be carried out.

The gearbox or drive with 2° of freedom may be either a pneumatic or a hydraulic transmission, which may be advantageous when employing an appropriate inventive system. In lieu of the transmission 8, there may be used, for example, an automatic transmission which is operated or controlled hydraulically or pneumatically. Thus it is possible to combine into one unit the inventive accumulator, as well as the transmission of the vehicle either with the hydraulic eqiupment of the vehicle, which is necessary in any case, or with the necessary pneumatic equipment of the vehicle as e.g. the pneumatic brake. Above all this leads to cost advantages, since the invention with its efficient pumps or motors 3 and 4 can supply a sufficient quantity of pressure medium as required by the entire vehicle, in particular, when in the case of a pressure drop due to excessive pressure medium consumption in the buffer reservoir 6, the control unit 7 automatically applies pressure until the nominal pressure in the buffer reservoir is again reached.

While there has been shown what is considered to be the preferred embodiment of the invention, it will be obvious that modifications may be made which come within the scope of the disclosure of the specification.

What is claimed is:

1. In a vehicular transmission including a power plant for driving an output shaft through the intermediary of a flywheel, an improvement comprising a gear drive having two degrees of freedom connected to said shaft, said gear drive having a first output; a first device operable selectively as a generator or motor connected to said first output and to said flywheel; a second device selectively operable as a generator or motor; said gear drive having a second output connected to said second drive; and buffer means interconnecting said first and second devices for the transfer of energy therebetween.

2. The improvement as claimed in claim 1, said first and second devices each being a fluid-driven motor.

3. The improvement as claimed in claim 1, said first and second devices each being a fluid-driven pump.

4. The improvement as claimed in claim 1, said first and second device each being a pneumatic motor.

5. The improvement as claimed in claim 1, said first and second devices each being a generator.

6. The improvement as claimed in claim 1, said first and second devices each being a hydraulic motor.

7. The improvement as claimed in claim 1, including a thermal generator having a heat output end in heat exchange relation with said buffer means.

8. The improvement as claimed in claim 1 comprising control means coupled to said first and second devices and to said buffer means for controlling the operation of said devices in accordance with the pressure in said buffer means.

9. The improvement as claimed in claim 8 wherein the pressure in said buffer means is maintained substantially constant.

* * * * *